United States Patent [19]

Cooksey

[11] E Re. 31,189

[45] Reissued Mar. 29, 1983

[54] VACUUM OPERABLE UNITS FOR IGNITION DISTRIBUTORS

[75] Inventor: William H. Cooksey, Walsall, England

[73] Assignee: Lucas Industries Limited, Birmingham, England

[21] Appl. No.: 20,202

[22] Filed: Nov. 16, 1979

Related U.S. Patent Documents

Reissue of:

[64] Patent No.: 3,847,063
Issued: Nov. 12, 1974
Appl. No.: 267,595
Filed: Jun. 29, 1972

[30] Foreign Application Priority Data

Jul. 2, 1971 [GB] United Kingdom ..... 31079/71

[51] Int. Cl.[3] ..... F01B 19/00; F16J 3/00

[52] U.S. Cl. ..... 92/100; 92/95; 92/131; 137/625.48

[58] Field of Search ..... 92/60.5, 94, 95, 100, 92/131, 13.2, 13.6; 137/625.48

[56] References Cited

U.S. PATENT DOCUMENTS

| | | | |
|---|---|---|---|
| 2,824,186 | 2/1958 | Binford | 92/95 |
| 2,837,119 | 6/1958 | Schwarz et al. | 92/95 |
| 2,905,199 | 9/1959 | Cook | 92/94 |
| 2,916,019 | 12/1959 | Murphy | 137/625.48 |
| 2,945,478 | 7/1960 | Hanna | 92/131 |
| 3,221,761 | 12/1965 | Kreuter | 92/94 |
| 3,648,571 | 3/1972 | Burgess | 92/100 |

FOREIGN PATENT DOCUMENTS

| | | | |
|---|---|---|---|
| 644649 | 4/1937 | Fed. Rep. of Germany | 92/131 |
| 46-19213 | 5/1971 | Japan . | |

*Primary Examiner*—Abraham Hershkovitz
*Attorney, Agent, or Firm*—Holman & Stern

[57] ABSTRACT

A vacuum operable unit for use in an ignition distributor of an internal combustion engine comprising a casing divided into first and second chambers by a diaphragm. A push rod is coupled to the diaphragm and extends through one wall of the first chamber, a seal engaging the wall of the chamber and the push rod so as to permit movement of the push rod with the diaphragm, while sealing the first chamber. First and second springs are positioned in the first and second chambers respectively, and either spring is operable on the diaphragm as the diaphragm moves in a direction to reduce the volume of the respective chamber. The housing supports a pair of abutments associated with the springs respectively, the springs engaging their respective abutments when the diaphragm is in a central position, so that in the central position neither spring acts on the diaphragm.

3 Claims, 1 Drawing Figure

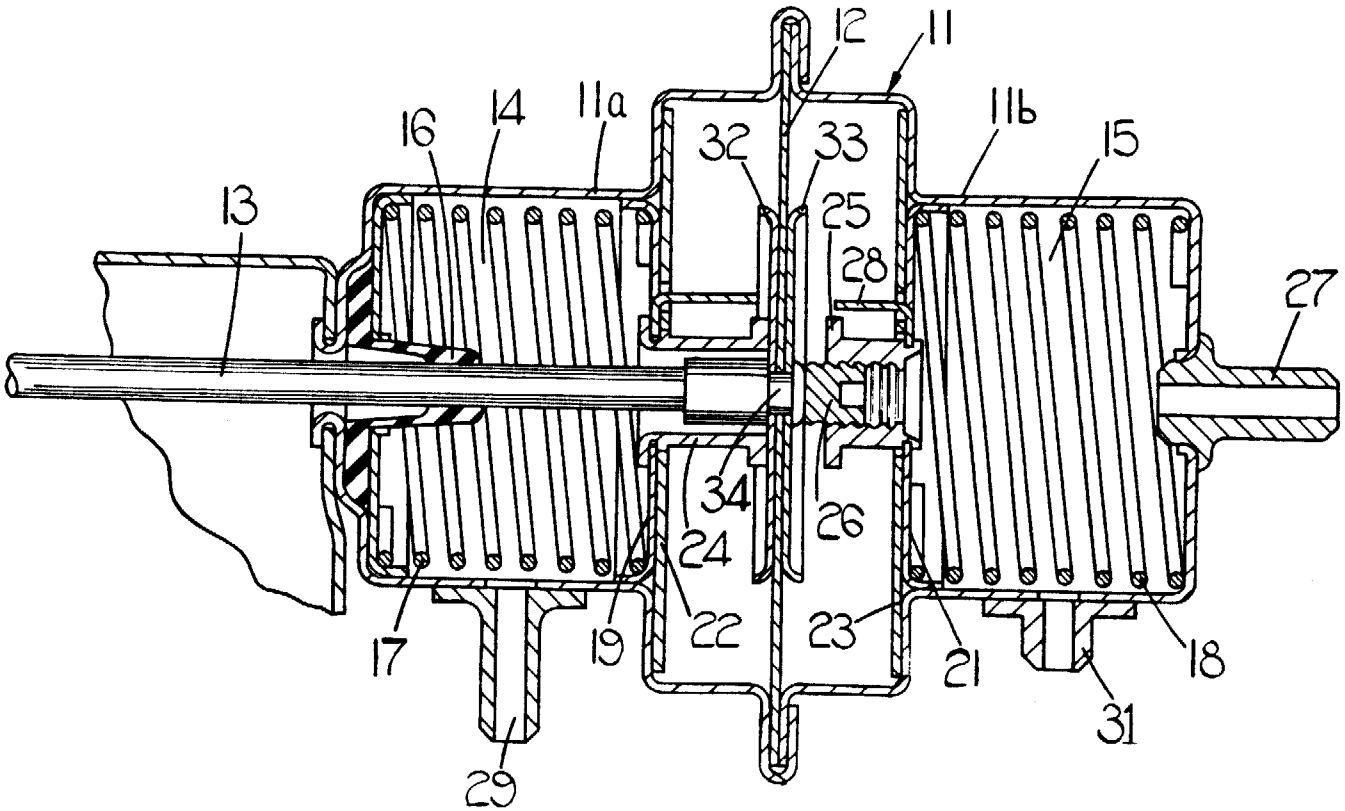
27
15
11b
11
12
33
32
11a
14
16
13
18
31
21
23
28
25
26
34
24
22
19
29
17

VACUUM OPERABLE UNITS FOR IGNITION DISTRIBUTORS

Matter enclosed in heavy brackets [ ] appears in the original patent but forms no part of this reissue specification; matter printed in italics indicates the additions made by reissue.

This invention relates to vacuum operable units for use with ignition distributors of internal combustion engines.

A unit in accordance with the invention includes a hollow casing divided into first and second chambers by a flexible diaphragm, a push rod coupled at one end to the diaphragm so as to move therewith and arranged at its other end to be coupled to the timing plate of an ignition distributor, said rod extending through the wall of said first chamber and sealing means engaging the wall of the first chamber and the rod to seal the chamber while permitting movement of the rod, first resilient means within the first chamber and engageable by the diaphragm during movement of the diaphragm in a direction to reduce the volume of the first chamber, second resilient means, within the second chamber and engageable by the diaphragm during movement of the diaphragm in a direction to reduce the volume of the second chamber, and first and second abutments carried by the casing and engageable by the first and second resilient means in a central position of the diaphragm so that in said central position neither of said first and second resilient means acts on said diaphragm.

Preferably, one of said first and second resilient means includes an adjustable extension through which that resilient means engages the diaphragm, said extension being adjusted to ensure that the diaphragm does not have any free movement relative to said first and second resilient means while at the same time ensuring that in said central position neither resilient means acts on the diaphragm.

Desirably said extension is adjustable from the exterior of the unit by way of a sealable aperture in the casing.

The accompanying drawing is a sectional view of a vacuum operable unit in accordance with one example of the invention.

Referring to the drawing, the unit includes a casing 11 which is hollow, and which is defined by a pair of generally cup shaped parts 11a 11b which are joined at their peripheries. The casing parts 11a 11b are substantially identical, and trapped between the joined peripheries of the casing parts 11a 11b is a flexible diaphragm 12. The diaphragm 12 divides the hollow casing 11 into first and second chambers 14, 15 and secured at one end to the diaphragm 12 and extending through the chamber 14 is a push rod 13. The push rod 13 extends through an aperture in the wall of the chamber 14, and engaged with the wall of the chamber 14 and the push rod 13 is a sealing member 16. The sealing member 16 permits movement of the rod 13 relative to the casing 11 while maintaining the chamber 14 sealed at the point at which the rod passes through the wall of the chamber.

The casing parts 11a 11b house respective compression springs 17, 18 which urge respective washers 19, 21 towards the diaphragm 12. Each of the washers 19, 21 is received in a cylindrical portion of its respective casing part 11a 11b and is slidable therein. Secured to the casing parts 11a 11b are respective annular abutment plates

22, 23 against which the washers 19, 21 are urged by their respective springs. Secured to the washer 19 and extending through the central aperture in the abutment plate 22 is an extension 24 which can engage a washer 32 on one face of the diaphragm 12. The extension 24 is in the form of a hollow sleeve, and encircles the rod 13. Secured to the washer 21 and extending through the central aperture in the abutment plate 23 is an internally screw-threaded extension 25 carrying a grub-screw 26 which can engage the end 34 of the push rod 13 which is deformed to trap a further washer 33 against the face of the diaphragm 12 remote from the washer 32. Moreover, aligned with the hollow extension 25 and secured to the casing part 11b is a sealable hollow spigot 27 through which a screw-driver can be inserted to engage the grub-screw 26. In order to resist rotation of the washer 21 and spring 18 during rotation of the grub-screw 26 relative to the extension 25, the washer 21 is provided with a projection 28 which extends through an aperture in the abutment plate 23. The washer 21 and the washer 19 are identical in order to minimize the number of different parts required in the manufacture of the unit. For this reason, the washer 19 has an extension which extends through an aperture in the associated abutment plate 22, but since the washer 19 does not carry a grub-screw, then the extension on the plate 19 is not required for any specific purpose. A conduit 29 is secured to the casing part 11a and communicates with the chamber 14, and a similar conduit 31 is secured to the casing part 11b and communicates with the chamber 15.

When the pressure acting on both sides of the diaphragm 12 is the same then the diaphragm 12 will assume a rest position. The length of the extension 24 is such that when the diaphragm is in its rest position and the washer 19 engages the abutment plate 22 then there is no clearance between the extension 24 and the washer 32. Moreover, the position of the grub-screw 26 relative to the extension 25 is so adjusted that with the diaphragm in its rest position and the washer 21 engaged with the abutment plate 23 there is no clearance between the screw 26 and the end 34 of the push rod 13. Thus the diaphragm, in the rest position, does not have any free movement relative to the springs 17, 18 while at the same time is not acted upon by the springs. In the event that owing to manufacturing tolerances the extension 24 does not touch the washer 32 in the rest position then the screw 26 is adjusted to take up any clearance, the effect of the slight inherent resilience of the diaphragm being negligible in comparison with the resilience of the springs 17, 18 in use.

The springs, 17, 18 are of course totally independent of one another and so when the diaphragm is moved in a direction to reduce the volume of the chamber 14 then the spring 18 takes no part in resisting or aiding the diaphragm movement, and similarly when the diaphragm is moving in a direction to reduce the volume of the chamber 15 then the spring 17 takes no part in either resisting or aiding the movement of the diaphragm.

The vacuum operable unit is particularly intended for use on an ignition distributor for an internal combustion engine having the facility for admitting air to the cylinders of the engine during closed throttle running conditions. The admission of air into the cylinders during closed throttle running conditions minimizes the percentage of noxious products in the exhaust of the internal combustion engine, by enhancing the combustion of fuel drawn into the cylinders during closed throttle conditions. However, the enhanced combustion of fuel causes an increase in the power output of the engine during closed throttle conditions, and obviously this is undesirable. Thus the distributor is arranged to retard the ignition timing of the engine beyond any normally retarded setting, during closed throttle conditions, the retardation of the ignition timing negating the effects of the enhanced fuel combustion. Thus in a practical embodiment, the free end of the rod 13 is connected to the timing plate of an ignition distributor, and the conduits 29, 31 are coupled to a valve which is operated in accordance with the position of the engine throttle. The valve determines which of the chambers 14, 15 is open to atmosphere, and which is subject to the engine inlet manifold depression at a given throttle condition. During normal running conditions, that is to say other than closed throttle conditions, the chamber 14 is connected through the valve to atmosphere, and the chamber 15 is connected to the inlet manifold at a point slightly above the throttle pivot so as to be adjacent the upstream edge of the open throttle. The variations in manifold depression cause movement of the diaphragm 12, and the movement of the diaphragm 12 is transmitted to the timing plate of the distributor by the rod 13. Thus variations in the pressure gradient between the chamber 14 and the chamber 15 during normal running of the engine controls the advance and retard of the timing of the engine in the usual manner. However, when the throttle of the engine is closed the pressure upstream of the throttle will be substantially atmospheric and so, the chamber 15 is opened to atmosphere. The valve connects the chamber 14 to the inlet manifold downstream of the throttle and since the throttle of the engine is closed, then there will be a high degree of vacuum in the manifold. Thus the diaphragm 12 will be moved to the left against the action of the spring 17 to retard the ignition timing of the engine beyond the maximum retardation which is achieved during normal running.

Since the action of the spring 17 is totally independent of the action of the spring 18 then the accuracy of the operation of the unit during normal conditions is not prejudiced by providing the facility for extra retard during closed throttle conditions. Thus the spring 18 can be set to give the optimum control characteristics for normal running of the engine without the necessity of having to provide for extra retard movement of the components of the unit. Similarly, the spring 17 can be chosen to give the optimum characteristics during closed throttle conditions without having to also accommodate the desired characteristics for normal running. In addition, the use of the extensions 24 and 25 sliding through apertures in the abutment plates 22, 23 affords accurate control of the overall range of movement of the diaphragm and therefore the overall range of timing adjustment which the unit can provide. The thickness of the abutment plates is known accurately and the lengths of the extensions 24, 25 from their respective washers 19, 21 on one side of their respective abutment plates to their respective peripheral flanges on the other side of the abutment plates, can be controlled accurately during machining of the extensions. Thus the permitted range of movement to the left (as shown) is governed by the length of the extension 24 while the permitted range of movement to the right is governed by the length of the extension 25. In practice in a distributor the unit could afford 12° of ignition timing adjustment on either side of the diaphragm rest position giving 24° in all, and could be controlled to an accuracy of plus or minus ½°.

I claim:

[1. A vacuum operable unit for use with an internal combustion engine ignition distributor including a hollow casing having a pair of fixed outer walls and divided into first and second chambers by a flexible diaphragm, a push rod coupled at one end to the diaphragm so as to move therewith and arranged at its other end to be coupled to the timing plate of an ignition distributor, said rod extending through said outer wall of said first chamber and sealing means engaging said outer wall of the first chamber and the rod to seal said first chamber while permitting movement of the rod, first resilient means within the first chamber having first retaining means at a first end thereof which is operatively acted upon by the diaphragm during movement of the diaphragm in a first direction from a central position thereof to reduce the volume of the first chamber, a second end thereof restrained by said outer fixed wall of said first chamber, second resilient means within the second chamber having second retaining means at a first end thereof which is operatively acted upon by the diaphragm during movement of the diaphragm in a second direction from said central position to reduce the volume of the second chamber, a second end thereof restrained by said outer fixed wall of said second chamber, and first and second abutment means fixed to the casing and engagable by said first and second retaining means respectively in said central position of the diaphragm for preventing said first and second resilient means respectively from operatively acting on said diaphragm in said central position, and first and second extensions on said first and second retaining means, respectively, extending through and beyond said first and second abutment means, respectively, for engaging said diaphragm.]

2. [A unit as claimed in claim 1 wherein] *A vacuum operable unit for use with an internal combustion engine ignition distributor including a hollow casing having a pair of fixed outer walls and divided into first and second chambers by a flexible diaphragm, a push rod coupled at one end to the diaphragm so as to move therewith and arranged at its other end to be coupled to the timing plate of an ignition distributor, said rod extending through said outer wall of said first chamber and sealing means engaging said outer wall of the first chamber and the rod to seal said first chamber while permitting movement of the rod, first resilient means within the first chamber having first retaining means at a first end thereof which is operatively acted upon by the diaphragm during movement of the diaphragm in a first direction from a central position thereof to reduce the volume of the first chamber, a second end thereof restrained by said outer fixed wall of said first chamber, second resilient means within the second chamber having second retaining means at a first end thereof which is operatively acted upon by the diaphragm during movement of the diaphragm in a second direction from said central position to reduce the volume of the second chamber, a second end thereof restrained by said outer fixed wall of said second chamber, and first and second abutment means fixed to the casing and engageable by said first and second retaining means respectively in said central position of the diaphragm for preventing said first and second resilient means respectively from operatively acting on said diaphragm in said central position, and first and second extensions on said first and second retaining means, respectively, extending through and beyond said first and second*

*abutment means, respectively, for engaging said diaphragm,* one of said first and second retaining means includes a means for adjusting its respective extension through which that retaining means engages the diaphragm, said extension being adjusted to ensure that the diaphragm does not have any free movement relative to said first and second resilient means while at the same time ensuring that in said central position neither resilient means acts on the diaphragm.

3. A unit as claimed in claim 2 wherein said means for adjusting its respective extension is adjustable from the exterior of the unit by way of a sealable aperture in casing.

4. A unit as claimed in claim 2 wherein said means for adjusting its respective extension is a screw in screw threaded engagement with a component of said one retaining means, said component including means for holding it against rotation relative to the casing to facilitate adjustment of the position of the screw.

* * * * *